United States Patent
Beaurepaire et al.

(10) Patent No.: US 9,344,868 B2
(45) Date of Patent: May 17, 2016

(54) METHOD AND APPARATUS FOR CONTEXTUAL CONTENT AND SERVICE FORWARDING FOR MOBILE DEVICES

(71) Applicant: NAVTEQ B.V., Veldhoven (NL)

(72) Inventors: Jerome Beaurepaire, Berlin (DE); Marko Tuukkanen, Schlenzer (DE); Juan Lablanca, Veldhoven (NL)

(73) Assignee: HERE Global B.V., Veldhoven (NL)

( * ) Notice: Subject to any disclaimer, the term of this patent is extended or adjusted under 35 U.S.C. 154(b) by 239 days.

(21) Appl. No.: 13/776,102

(22) Filed: Feb. 25, 2013

(65) Prior Publication Data

US 2014/0244782 A1    Aug. 28, 2014

(51) Int. Cl.
- *G06F 15/16* (2006.01)
- *H04W 4/20* (2009.01)
- *H04W 4/02* (2009.01)

(52) U.S. Cl.
CPC ............... *H04W 4/206* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 2009/0054108 A1* | 2/2009 | Kito | 455/566 |
| 2011/0195699 A1* | 8/2011 | Tadayon et al. | 455/418 |
| 2012/0115501 A1* | 5/2012 | Zheng | 455/456.1 |
| 2014/0141714 A1* | 5/2014 | Ghosh et al. | 455/39 |

FOREIGN PATENT DOCUMENTS

EP    1734443 A1 * 12/2006 ............ H04M 1/725

\* cited by examiner

*Primary Examiner* — Mohamed Ibrahim
(74) *Attorney, Agent, or Firm* — Ditthavong & Steiner, P.C.

(57) ABSTRACT

An approach is provided for determining context information associated with one or more mobile devices and transferring content and services between the devices based on the contextual information. A transfer platform determines context information associated with at least one device, at least one other device, or a combination thereof. The transfer platform then causes, at least in part, at least one transfer of one or more functionalities of the at least one device, content associated with the at least one device, or a combination thereof from the at least one device to the at least one other device based, at least in part, on the context information.

21 Claims, 10 Drawing Sheets

METHOD AND APPARATUS FOR CONTEXTUAL CONTENT AND SERVICE FORWARDING FOR MOBILE DEVICES

BACKGROUND

Service providers and device manufacturers (e.g., wireless, cellular, etc.) are continually challenged to deliver value and convenience to consumers by, for example, providing compelling network services. One area of interest has been the development of services that enable users of mobile devices (e.g., mobile phones and/or tablets) to enjoy a wide range of functionalities such as making and receiving telephone and/or video calls, sending and receiving text messages (e.g., via short message service (SMS), multimedia messaging service (MMS), etc.), browsing the Internet, transmitting or receiving data (e.g., mapping and/or navigation information, media, social networking updates, etc.), etc., and these functionalities can often be used simultaneously. Consequently, mobile devices have become ubiquitous to everyday life. However, in certain contexts, the activation and/or simultaneous use of two separate functionalities can easily distract or even annoy a user. For example, when using a mobile device for navigation while driving, a user may not want to be distracted by an incoming call that may interrupt the navigation instructions. However, at the same time, he or she may not want to miss the call. Further, the constant and/or simultaneous use of multiple functionalities can quickly drain the battery of a mobile device, rendering the one or more functionalities temporarily inoperable. Given our increasing reliance on mobile devices, being without such functionalities, even for a short period of time, may reduce consumer satisfaction. Accordingly, service providers and device manufacturers face significant technical challenges in providing a service that determines contextual information associated with one or more mobile devices within close proximity to one another and then transfers one or more functionalities between the devices to reduce distractions and to ensure continuity of the one or more functionalities.

SOME EXAMPLE EMBODIMENTS

Therefore, there is a need for an approach for determining context information associated with one or more mobile devices and transferring content and services between the devices based on the context information.

According to one embodiment, a method comprises determining context information associated with at least one device, at least one other device, or a combination thereof. The method also comprises causing, at least in part, at least one transfer of one or more functionalities of the at least one device, content associated with the at least one device, or a combination thereof from the at least one device to the at least one other device based, at least in part, on the context information.

According to another embodiment, an apparatus comprises at least one processor, and at least one memory including computer program code for one or more computer programs, the at least one memory and the computer program code configured to, with the at least one processor, cause, at least in part, the apparatus to determine context information associated with at least one device, at least one other device, or a combination thereof. The apparatus also causes, at least in part, at least one transfer of one or more functionalities of the at least one device, content associated with the at least one device, or a combination thereof from the at least one device to the at least one other device based, at least in part, on the context information.

According to another embodiment, a computer-readable storage medium carries one or more sequences of one or more instructions which, when executed by one or more processors, cause, at least in part, an apparatus to determine context information associated with at least one device, at least one other device, or a combination thereof. The apparatus also causes, at least in part, at least one transfer of one or more functionalities of the at least one device, content associated with the at least one device, or a combination thereof from the at least one device to the at least one other device based, at least in part, on the context information.

According to another embodiment, an apparatus comprises means for determining context information associated with at least one device, at least one other device, or a combination thereof. The apparatus also comprises means for causing, at least in part, at least one transfer of one or more functionalities of the at least one device, content associated with the at least one device, or a combination thereof from the at least one device to the at least one other device based, at least in part, on the context information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining context information associated with one or more mobile devices and transferring content and services between the devices based on the context information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
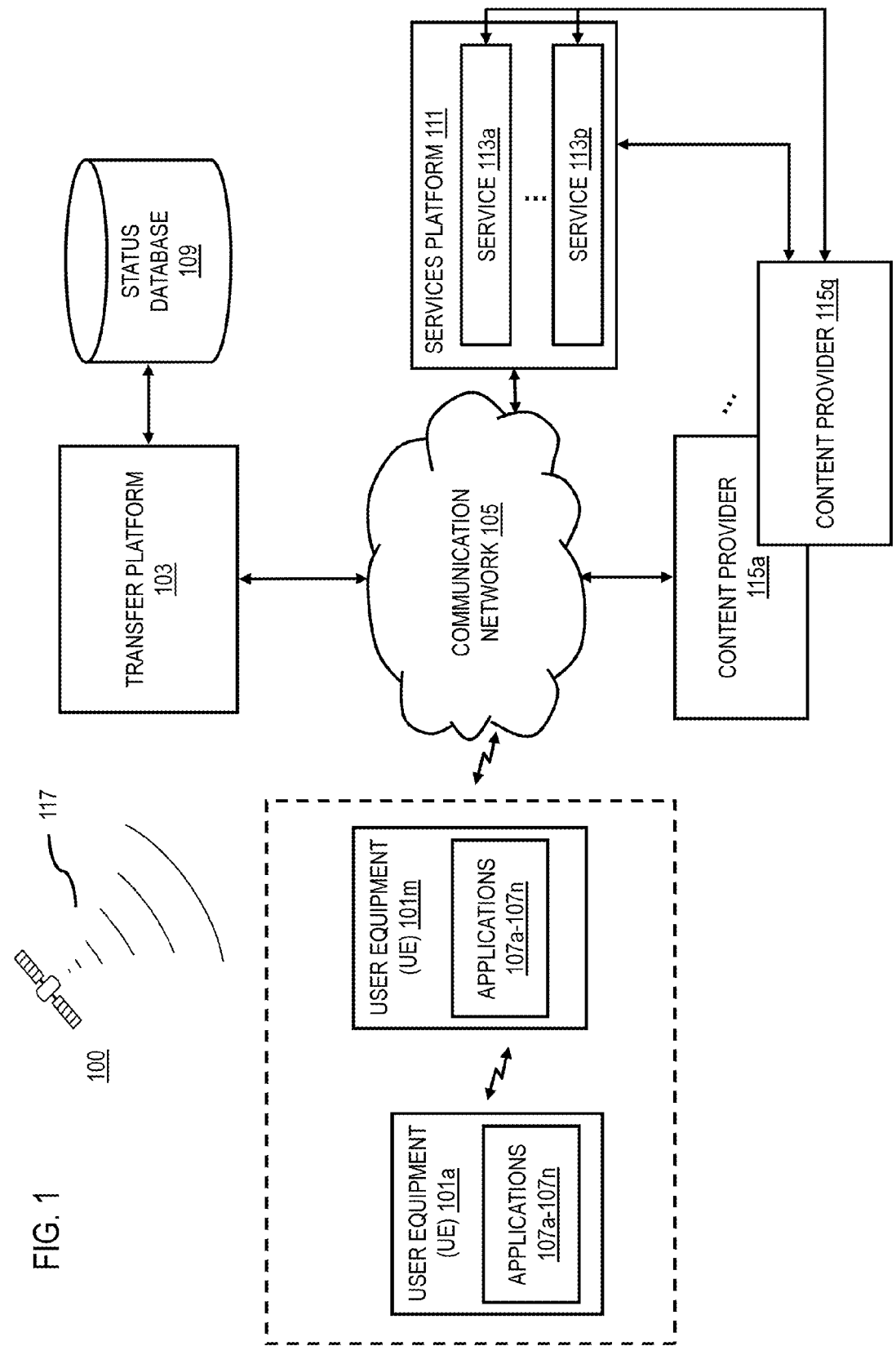
FIG. 1 is a diagram of a system capable of determining context information associated with one or more mobile devices and transferring content and services between the devices based on the contextual information, according to one embodiment.

FIG. 1 is a diagram of a system capable of determining context information associated with one or more mobile devices and transferring content and services between the devices based on the context information, according to one embodiment. As previously discussed, one area of interest among service providers and device manufacturers has been the development of services and/or applications that enable users of mobile devices to enjoy a wide range of functionalities. However, in certain contexts, the activation and/or simultaneous use of two separate functionalities may distract or even annoy a user. For example, when using a mobile device (e.g., a mobile phone) for navigation while driving, a user may not want an incoming telephone call to interrupt the navigation service, but he or she may not want to miss the call. One possible solution to avoid incoming calls while driving is to manually enable a call forwarding feature or to remain offline. However, manually configuring a mobile device each time is cumbersome and setting the phone to an offline status can also prevent the use of navigation services associated with the mobile device. Another possible solution is to forward the call using a network operator provided service (e.g., a standard global system for mobile communications (GSM) feature) after the driver has answered the incoming telephone call. However, this solution also requires considerable manual interaction. Further, the constant and/or simultaneous use of one or more functionalities can quickly drain the battery of a mobile device, rendering the one or more functionalities temporarily inoperable. Given the increasing reliance on such services on the part of consumers, being without such functionalities, even for a short period of time, often reduces overall consumer satisfaction.

To address this problem, a system 100 of FIG. 1 introduces the capability to determine context information associated with one or more mobile devices and transfer content and services between the devices based on the context information. As shown in FIG. 1, the system 100 comprises one or more user equipment (UE) 101a-101m (e.g., mobile phones and/or tablets) (also collectively referred to as UEs 101) having connectivity to a transfer platform 103 via a communication network 105. The UEs 101 also have connectivity to one another via one or more short-range communication technologies (e.g., Bluetooth® (Bluetooth), Bluetooth Low Energy (BLE), near field communication (NFC), wireless fidelity (WiFi), or a combination thereof). The UEs 101 also include or having access to one or more applications 107a-107n (also collectively referred to as applications 107). By way of example, the applications 107 may include mapping and/or navigation applications, location-based services (e.g., enabling restaurant "check-ins"), messaging applications (e.g., SMS, MMS, etc.), an Internet browser, media applications (e.g., music streaming, photo exchange, etc.), social networking applications, etc.

In one embodiment, the transfer platform 103 may include or be associated with at least one status database 109, which may exist in whole or in part within the transfer platform 103. In one example embodiment, the transfer platform 103 may exist in whole or in part within the UEs 101, or independently. The status database 109 may include a list of one or more authenticated devices based, at least in part, on the Bluetooth addresses associated with the UEs 101, for example, capability status information associated with the UEs 101 (e.g., device specifications), one or more user preferences (e.g., transfer content and/or services to my spouse's device before any other devices), one or more automatic protocols (e.g., transfer "x" when the battery status is at 50%, transfer "x" and "y" when the battery status is between 50% and 25%, and transfer "x", "y", and "z" when the battery status is below 25%, etc.), or a combination thereof.

The UEs 101 are also connected to a services platform 111 via the communication network 105. The services platform 111 includes one or more services 113a-113p (also collectively referred to as services 113). The services 113 may include a wide variety of services such as content provisioning services for one or more of the applications 107. By way of example, the services 113 may include mapping and/or navigation services, phone and electronic communication services (e.g., email, SMS, etc.), location-based services, media related services (e.g., audio/video streaming, picture sharing, etc.), social networking services, etc. The UEs 101, the services platform 111, and the services 113 also have connectivity to one or more content providers 115a-115q (also collectively referred to as content providers 115). The content providers 115 also may provision a wide variety of content (e.g., maps, guidance commands, etc.) to the components of the system 100.

In certain embodiments, the applications 107 may utilize location-based technologies (e.g., global positioning systems (GPS), cellular triangulation, Assisted GPS (A-GPS), etc.) to make a request to one or more services 113 for location-based data (e.g., mapping and/or navigation information, social networking information, etc.) based on a position relative to a UE 101. For example, a UE 101 may include a GPS receiver to obtain geographic coordinates from the satellites 117 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the system 100 determines context information associated with at least one device, at least one other device, or a combination thereof (e.g., mobile phones and/or tablets). More specifically, the context information is based, at least in part, on battery status (e.g., 100% battery life, 50% battery life, 25% battery life, etc.), operation status (e.g., running a navigation application), capability status (e.g., an operating system, audio/video capabilities, memory capacity, etc.), user preference (e.g., one or more preferences regarding forwarding and/or accepting one or more functionalities), or a combination thereof. In one embodiment, it is contemplated that the system 100 determines at least the battery and the capability status of the at least one other device to determine whether at least one transfer of one or more functionalities of the at least one device, for example, would make sense. In particular, the one or more functionalities may include phone calls, text messages (e.g., SMS, MMS, etc.), calendar events, contacts, etc. By way of example, if the at least one other device had less battery life than the at least one device, transferring one or more functionalities may not make sense. Similarly, if the at least one other device was unable to display photos or videos, transferring one or more video conference calls, for example, would also not make sense.

In one embodiment, the system 100 determines at least one location of the at least one device (e.g., a device owned by the driver of a vehicle), at least one other device (e.g., a device owned by the front seat passenger), or a combination thereof based, at least in part, on the one or more short-range communication technologies, one or more user inputs, or a combination thereof. By way of example, in an example use case involving an automobile, the system 100 can determine the location of the at least one device, the at least one other device, or a combination thereof based, at least in part, on at least one connection to a Bluetooth, BLE, or WiFi network associated with the automobile. In another example use case, the system 100 can determine the location of the at least one device, at least one other device, or a combination thereof based, at least in part, on a user input such as a "check in" on a social networking service.

In one embodiment, the system 100 determines relationship information associated with a user of the at least one device, at least one user of the at least one other device, or a combination thereof based, at least in part, on the one or more short-range communication technologies, one or more social networking services, user input, or a combination thereof. By way of example, the system 100 may use the relationship information to prioritize which at least one other device the system 100 will first attempt to transfer one or more functionalities of the at least one device, content associated with the at least one device, or a combination thereof to. For example, in the automobile example use case, when a driver's spouse has also checked in to the vehicle, the system 100 can assign a higher priority to his or her device compared to one or more other devices that the system 100 may also determine are in the vehicle (e.g., at least one other device associated with a child). In one embodiment, the system 100 can determine the location of the one or more other devices within a vehicle based, at least in part, on the vehicle's sensors (e.g., one or more Bluetooth access points) and then prioritize the one or more other devices according to their respective locations. For example, the system 100 may determine to assign a device near the front seat of the vehicle with a higher priority than a device near the backseat.

In one or more embodiments, the system 100 can determine at least one change of context information. For example, the system 100 can determine a change of battery status associated with the at least one device, the at least one other device, or a combination thereof. In another example use case, the system 100 can determine an activation or deactivation of one or more services or applications on the at least one device that can be disrupted by the simultaneous use of one or more other functionalities of the at least one device (e.g., a navigation or gaming application and an incoming telephone call).

In one embodiment, the system 100 causes, at least in part, at least one presentation of the changed context information in a user interface of the at least one device. For example, when the owner of the at least one device starts a navigation application while driving, the system 100, having already determined that one or more other devices are also onboard, can cause, at least in part, a presentation of the changed context by stating, "Starting navigation, do you want your calls to be forwarded to one of your passengers during the navigation?" In another example use case, a user of the at least one device may be on a weekend trip with a friend and has forgotten his or her phone charger. However, the user still wants to use one or more functionalities of the at least one device. As a result, the system 100, having already determined that one or more other devices are nearby (e.g., the at least one other device of his or her friend) can cause, at least in part, a presentation of the change context by stating, "Battery is about to die! Do you want to transfer one or more functionalities of your phone to another device?" and/or "Battery is fully charged—recovering the transferred functionalities." In one embodiment, it is contemplated that the system 100 may also cause, at least in part, the at least one device (e.g., a mobile phone) to indicate the changed context information by various other means (e.g., sound, light, vibration, etc.).

In one embodiment, the system 100 causes, at least in part, at least one presentation of the one or more functionalities of the at least one device that can be transferred, at least one other user, or a combination thereof. As previously discussed, the one or more functionalities of the at least one device may include phone calls, text messages, calendar events, contacts, etc. By way of example, the at least one other user may be a family member, a friend (e.g., a social networking friend), or a combination thereof of the owner of the at least one device. In one or more embodiments, the system 100 then determines at least one selection of the one or more functionalities, the at least one other user, or a combination thereof. For example, the system 100 can determine the at least one selection based, at least in part, on at least one user input (e.g., a keypad entry or a voice command).

In one embodiment, the system 100 causes, at least in part, at least one transfer of the one or more functionalities of the at least one device, content associated with the at least one device, or a combination thereof from the at least one device to at least one other device based, at least in part, on the context information. In particular, the at least one transfer by the system 100 is based, at least in part, on the one or more short-range communication technologies including, at least in part, Bluetooth, BLE, NFC, WiFi, or a combination thereof. Moreover, it is contemplated that the system 100 causes the at least one transfer without requiring the owner of the at least one device to transfer his or her subscriber identity module (SIM) card from the at least one device to at least one other device. When the one or more functionalities transferred by the system 100 include a telephone call, it is contemplated that one of the benefits of the transfer is privacy, at least compared to using a vehicle's hands-free system (i.e., only certain persons in the vehicle can participate on the call).

In one example use case, it is contemplated that the at least one device (e.g., a mobile phone or a tablet) would include at least one NFC tag since an NFC tag can continue to function even when the battery life of the at least one device is considerably low. In another example use case, it is contemplated that the content transferred by the system 100 may be assigned to one or more dedicated folders on the at least one other device, which the system 100 can then cause to be automatically deleted for privacy reasons when the system 100 determines that the one or more functionalities have been restored to the at least one device (e.g., based on a battery charge). In one embodiment, it is further contemplated that the at least one other device may include, at least in part, one or more directional audio speakers so that the system 100 can cause, at least in part, at least one transfer of an incoming call from the at least one device to one or more directional audio speakers closest to a selected passenger (e.g., a passenger in the backseat).

In one embodiment, the system 100 determines one or more automatic protocols for causing, at least in part, the at least one transfer based, at least in part, on the context information, the relationship information, or a combination thereof. By way of example, the one or more automatic protocols may be based, at least in part, on the system 100's determination of the battery status of the at least one device. For example, in one embodiment, if the system 100 determines that the battery status of the at least one device is above 50%, then the system 100 will not automatically cause the at least one transfer. However, if the system 100 determines that the battery status of the at least one device is at 50%, then the system 100 can cause the at least one transfer of all online services (e.g., video conference calls, emails, calendar updates, etc.) to at least one other device. In one embodiment, it is contemplated that the system 100 will only cause the at least one transfer to at least one other device if the battery status of the at least one other device is greater than the battery status of the at least one device and the at least one other device has similar capabilities as the at least one device (e.g., both devices are smartphones). Thereafter, if the system 100 determines that the battery life of the at least one device is between 50% and 25%, then the system 100 can cause the at least one transfer of all remaining functionalities to the at least one other device except text messages (e.g., SMS, MMS, etc.). Then, if the system 100 determines that the battery status of the at least one device is less than 25%, the system 100 can cause the at least one transfer of all text messages to the at least one other device and thereby completely transfer all of the one or more functionalities of the at least one device to the at least one other device.

Similarly, in another example use case, if the system 100 determines that the battery status of the at least one device is at 50%, then the system 100 can cause the at least one transfer to at least one other device owned by a nearby spouse or adult family member, for example. However, if the system 100 determines that the battery life of the at least one device is between 50% and 25%, then the system 100 can cause the at least one transfer to at least one other device owned by any proximate family member (e.g., even a child). Thereafter, if the system 100 determines that the battery life of the least one device is less than 25%, then the system 100 can cause the at least one transfer to at least one other device owned by anyone that the owner of the at least one device knows or is friends with (e.g., a social networking friend). Moreover, in one embodiment, it is contemplated that in this most dire situation (e.g., less than 25% battery life), the one or more automatic protocols may include transferring the one or more functionalities to at least one other device of a family member or close friend regardless of his or her proximity (e.g., transferring the one or more functionalities through a cloud).

In one embodiment, the system 100 causes, at least in part, a termination of the at least one transfer based, at least in part, on the changed context information, user input, or a combination thereof. By way of example, in the automobile example use case, when the owner of the at least one vehicle stops driving while using his or her navigation application (e.g., either by stopping the application or by exiting the car), the system 100 can cause a termination of the at least one transfer of incoming calls, for example, from the at least one device to at least one other device. Similarly, in the weekend trip example use case, when the system 100 determines that the at least one device is being charged (e.g., upon returning from the weekend trip), the system 100 can cause a termination of the at least one transfer to the at least one other device. As previously discussed, at this point, the system 100 may also cause the automatic deletion of the one or more functionalities associated with the at least one device, the content associated with the at least one device, or a combination thereof that were previously transferred to the at least one other device based, at least in part, on the charging of the at least one device.

By way of example, the UEs 101, the transfer platform 103, the applications 107, the status database 109, the services platform 111, the services 113, the content providers 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
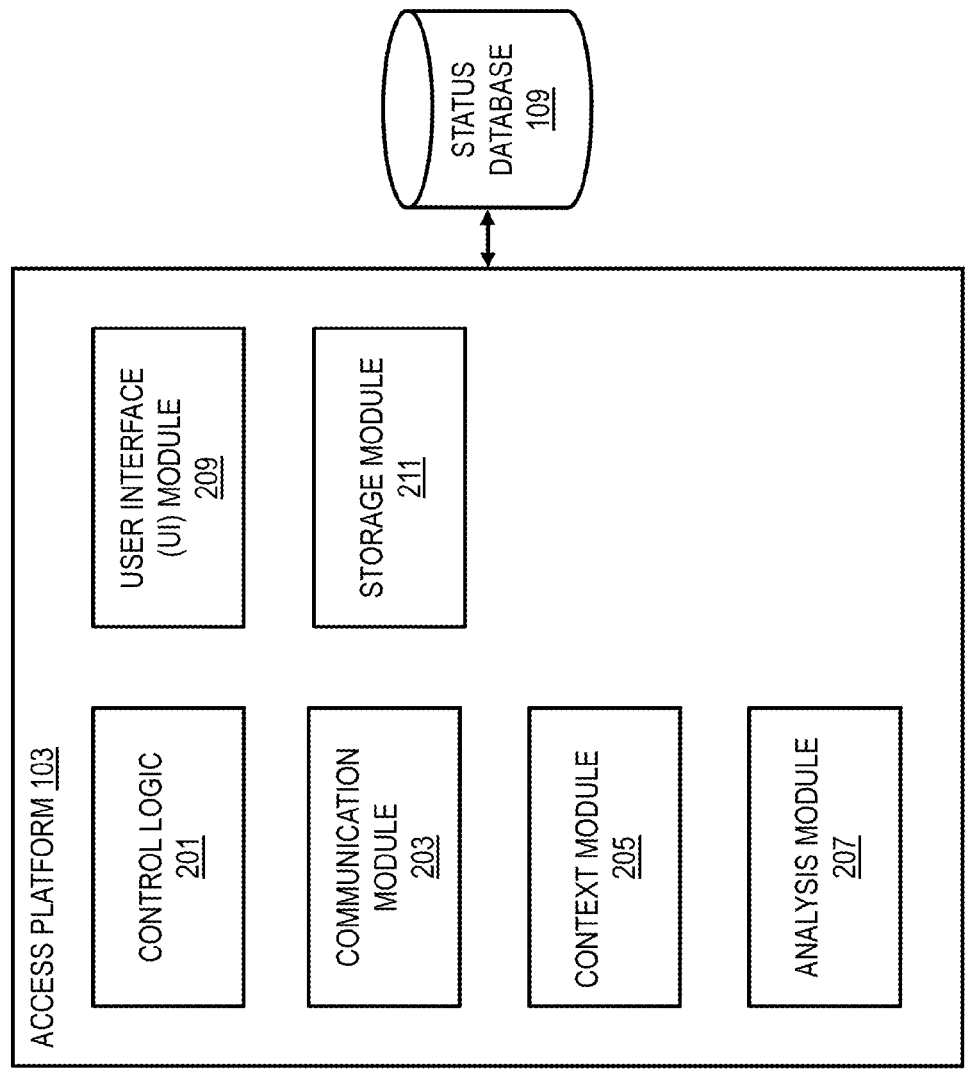
FIG. 2 is a diagram of the components of a transfer platform, according to one embodiment.

FIG. 2 is a diagram of the components of transfer platform 103, according to one embodiment. By way of example, the transfer platform 103 includes one or more components for determining context information associated with one or more mobile devices and transferring content and services between the devices based on the context information. It is contemplated that the functions of these components may be combined in one or more components or performed by other components of equivalent functionality. In this embodiment, the transfer platform 103 includes a control logic 201, a communication module 203, a context module 205, an analysis module 207, a user interface (UI) module 209, and a storage module 211.

The control logic 201 oversees tasks, including tasks performed by the communication module 203, the context module 205, the analysis module 207, the UI module 209, and the storage module 211. For example, although other modules may perform the actual task, the control logic 201 may determine when and how those tasks are performed or otherwise direct the other modules to perform the task. In one embodiment, the control logic 201 also may be used to cause, at least in part, at least one transfer of the one or more functionalities of the at least one device (e.g., telephone calls), content associated with the at least one device (emails, text messages, etc.), or a combination thereof from the at least one device to the at least one other device based, at least in part, on the context information. The control logic 201, in connection with the context module 205, may also cause, at least in part, a termination of the at least one transfer based, at least in part, on the changed context information (e.g., charging the at least one device), user input, or a combination thereof.

The communication module 203 in certain embodiments is used for communication between the UEs 101, the transfer platform 103, the applications 107, the status database 109, the services platform 111, the services 113, the content providers 115, and the satellites 117. The communication module 203 also may be used to facilitate one or more short-range communications between the UEs 101 including, at least in part, Bluetooth, BLE, NFC, WiFi, or a combination thereof. More specifically, in one embodiment, the communication module 203 may also be used in connection with the UI module 209 to cause, at least in part, at least one presentation of the changed context information in a user interface of the at least one device. The communication module 203 also may be used in connection with the UI module 209 to cause, at least in part, at least one presentation of the one or more functionalities of the at least one device that can be transferred, the at least one other user, or a combination thereof in the user interface of the at least one device.

The context module 205 in certain embodiments is used to determine context information associated with at least one device, at least one other device, or a combination thereof. By way of example, the context information may include battery status, operation status (e.g., running at least one navigation application), capability status (e.g., an operating system, memory capacity, etc.), user preference, or a combination thereof. The context module 205, in connection with the communication module 203 and the UI module 209, may also be used to determine at least one location of the at least one device, the at least one other device, or a combination thereof based, at least in part, on one or more short-range communication technologies, one or more user inputs, or a combination thereof. The context module 205 also may be used to determine at least one change of the context information (e.g., activating or deactivating a navigation application, entering or leaving a vehicle, etc.).

In one embodiment, the analysis module 207 is used to determine relationship information associated with a user of the at least one device, at least one user of the at least one other device, or a combination thereof based, at least in part, on one or more short-range communication technologies, one or more social networking services, user input, or a combination thereof. The analysis module 207 may also be used to determine one or more automatic protocols for causing, at least in part, the at least one transfer based, at least in part, on the context information, the relationship information, or a combination thereof. For example, the owner of the at least one device may establish one or more automatic protocols ahead of time for when the battery status of the at least one device is at 50%, between 50% and 25%, below 25%, etc.

The UI module 209 in certain embodiments is used in connection with the communication module 203 to cause, at least in part, at least one presentation of the changed context information in a user interface of the at least one device (e.g., "Battery is about to die!"). In one embodiment, it is contemplated that the at least one presentation may also include one or more sounds, lights, vibrations, etc. associated with the at least one device. The UI module 209 may also be used in connection with the communication module 203 to cause, at least in part, at least one presentation of the at one or more functionalities of the at least one device that can be transferred (e.g., phone calls, SMS, emails, pictures, etc.), the at least one other user (e.g., a front seat passenger), or a combination thereof in the user interface of the at least one device. The UI module 209 also may be used to determine at least one selection of the one or more functionalities, the at least one other user, or a combination thereof (e.g., a keypad entry or a voice command).

In one embodiment, the storage module 211 is used to manage the storage of the list of one or more authenticated devices, capability status information associated with the UEs 101, one or more user preferences, and/or one or more automatic protocols stored in the status database 109.

Figure 3:
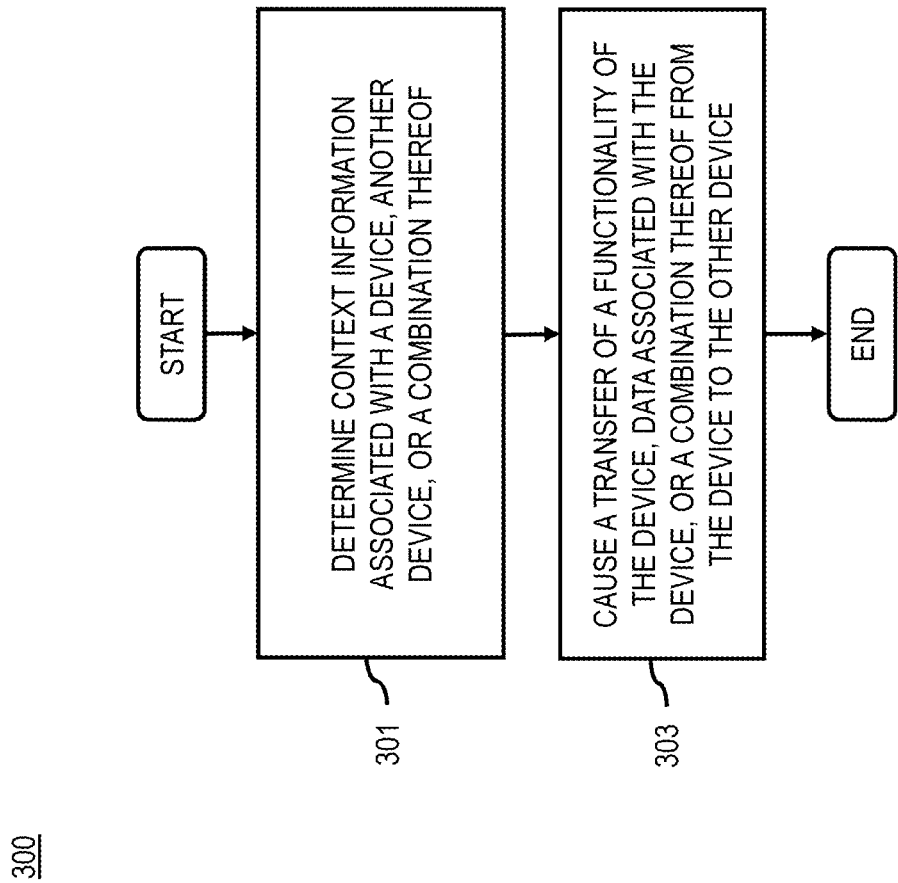
FIGS. 3-5 are flowcharts of processes for determining context information associated with one or more mobile devices and transferring content and services between the devices based on the context information, according to one embodiment.
Figure 4:
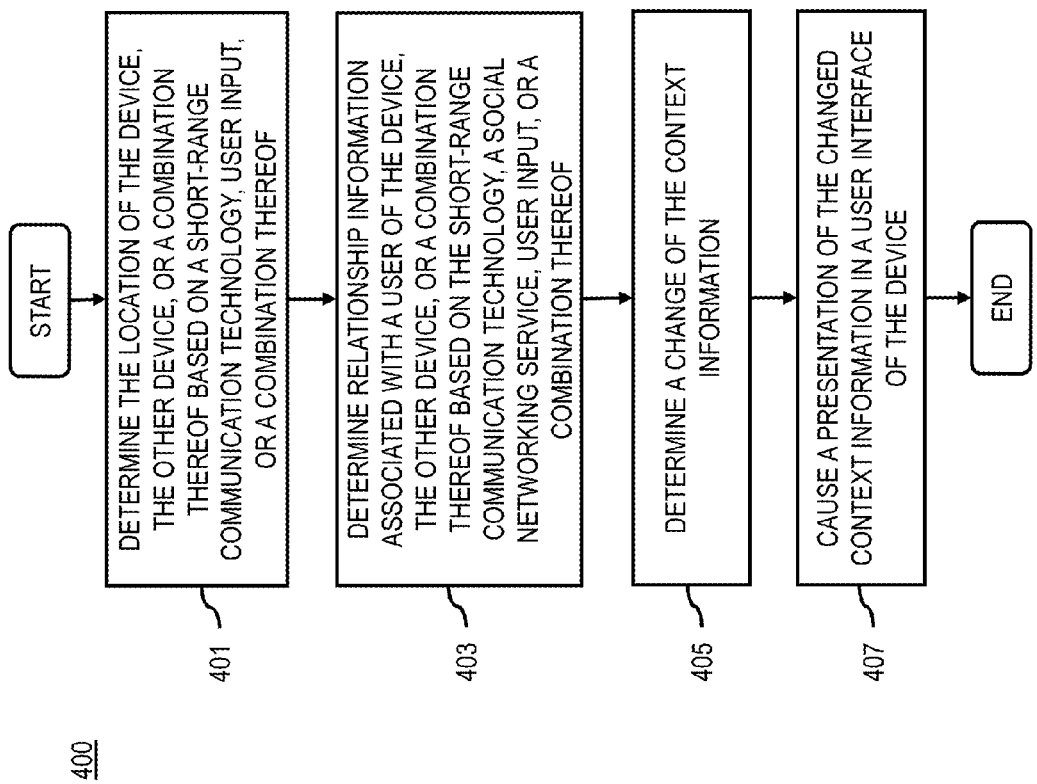
Figure 5:
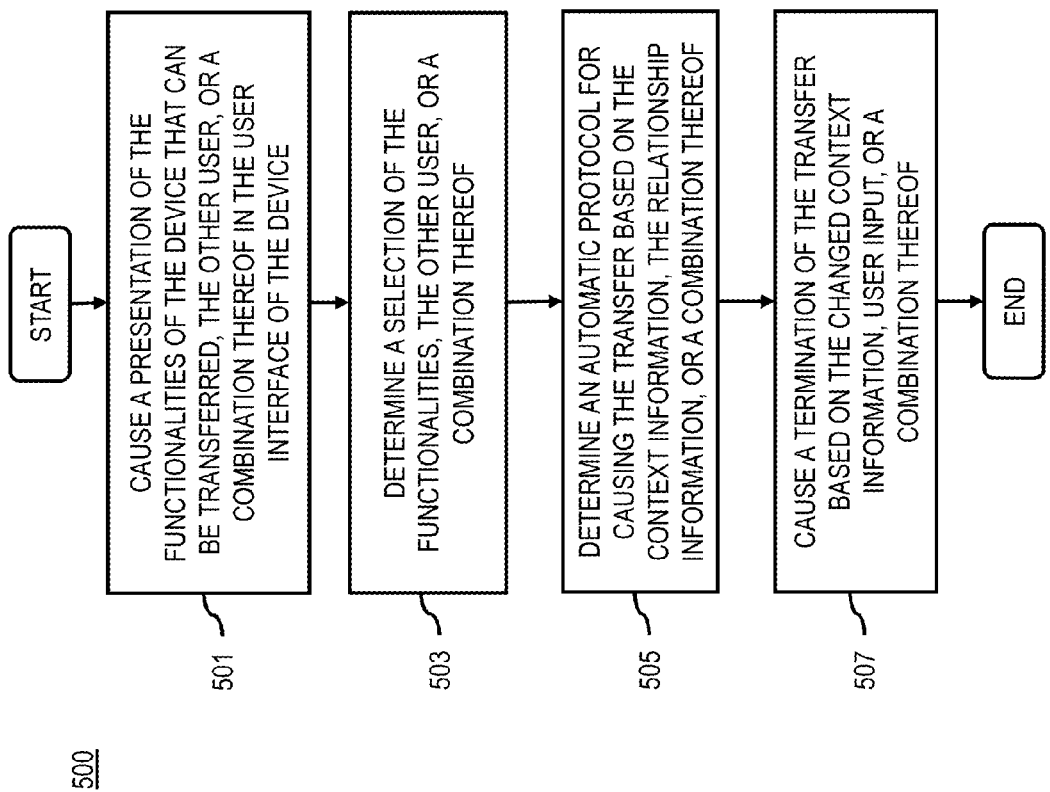
Figure 9:
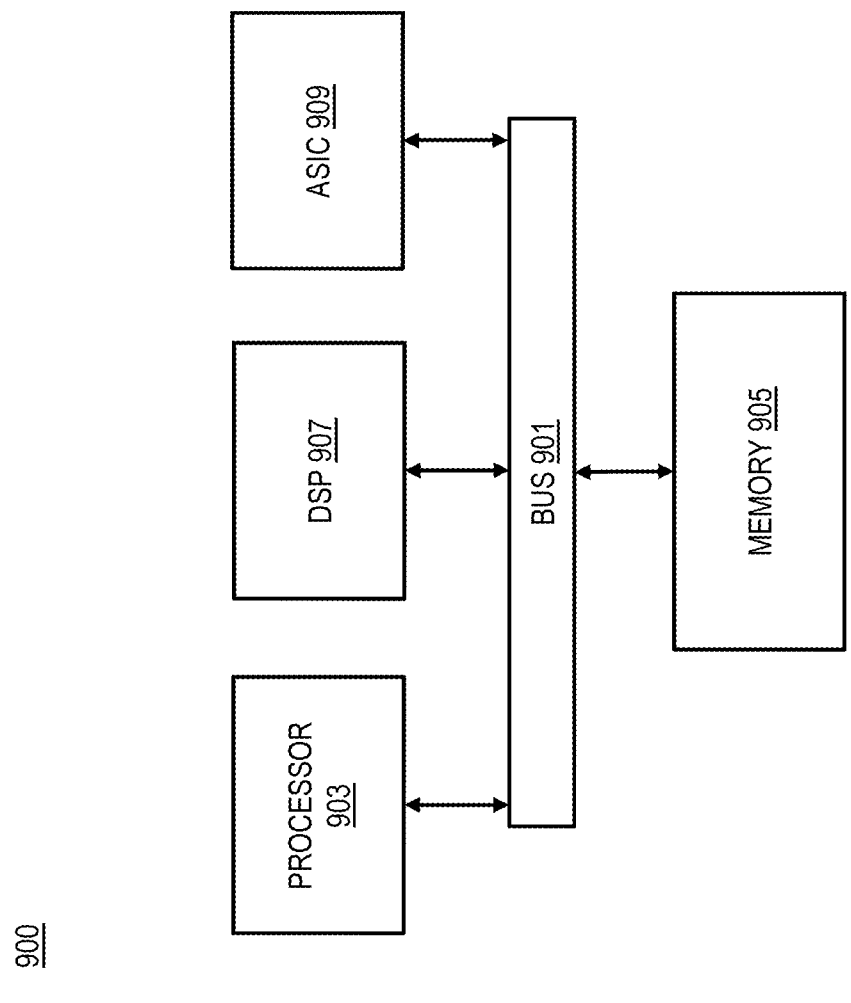
FIG. 9 is a diagram of a chip set that can be used to implement an embodiment of the invention.

FIG. 3-5 are flowcharts of processes for determining context information associated with one or more mobile devices and transferring content and services between the devices based on the contextual information, according to one embodiment. In one embodiment, the transfer platform 103 performs the process 300 and is implemented in, for instance, a chip set including a processor and a memory as shown in FIG. 9. In step 301, the transfer platform 103 determines context information associated with at least one device, at least one other device, or a combination thereof. In particular, the context information is based, at least in part, on battery status, operation status (e.g., running a navigation application), capability status (e.g., an operating system, audio/video capabilities, memory capacity, etc.), user preference (e.g., one or more preferences regarding forwarding and/or accepting one or more functionalities), or a combination thereof associated with the at least one device, the at least one other device, or a combination thereof (e.g., mobile phones and/or tablets). In one embodiment, it is contemplated that the transfer platform 103 determines at least the battery and capability status of the at least one other device to determine whether at least one transfer of one or more functionalities (e.g., phone calls, text messages, calendar events, contacts, etc.) would make sense. As previously discussed, if the at least one other device has less battery life than the at least one device, transferring one or more functionalities may not make sense.

In step 305, the transfer platform 103 causes, at least in part, at least one transfer of one or more functionalities of the at least one device, content associated with the at least one device, or a combination thereof from the at least one device to the at least one other device based, at least in part, on the context information. In particular, the at least one transfer by the transfer platform 103 is based, at least in part, on one or more short-range communication technologies. Moreover, in one example use case, it is contemplated that the at least one device would include at least one NFC tag since an NFC tag can continue to function even when the battery status of the at least one device is considerably low. In addition, it is contemplated that the transfer platform 103 causes, at least in part, the at least one transfer without requiring the owner of the at least one device to transfer his or her SIM card to the at least one other device.

FIG. 4 depicts a process 400 of determining and presenting contextual and relationship information, according to one embodiment. In one embodiment, the transfer platform 103 performs the process 400 and is implemented in, for instance, a chip set including a processor and a memory as shown in FIG. 9. In step 401, the transfer platform 103 determines at least one location of the at least one device, the at least one other device, or a combination thereof based, at least in part, on the one or more short-range communication technologies, one or more user inputs, or a combination thereof. By way of example, in the automobile example use case, the transfer platform 103 can determine the location of the at least one device, the at least one other device, or a combination thereof (e.g., mobile phones and/or tablets) based, at least in part, on at least one connection to a Bluetooth, BLE, or WiFi network associated with the automobile. In another example use case, the transfer platform 103 can determine the location of the at least one device, the at least one other device, or a combination thereof based, at least in part, on a user input such as a "check in" on a social networking service.

In step 403, the transfer platform 103 determines relationship information associated with a user of the at least one device, at least one user of the at least one other device, or a combination thereof based, at least in part, on one or more short-range communication technologies, one or more social networking services, user input, or a combination thereof, wherein the at least one transfer is further based, at least in part, on the relationship information. For example, the transfer platform 103 may use the relationship information to prioritize which at least one other device the transfer platform 103 will first attempt to transfer one or more functionalities. As previously discussed, when a deriver's spouse has also checked in to the vehicle, the transfer platform 103 can assign a higher priority to his or her device compared to one or more other devices that the transfer platform 103 determines are also in the vehicle, for example.

In step 405, the transfer platform 103 determines at least one change of the context information. By way of example, the transfer platform 103 can determine a change of battery status associated with the at least one device, the at least one other device, or a combination thereof (e.g., 100% battery life to 50% battery life to 25% battery life, etc.). In another example use case, the transfer platform 103 can determine an activation or deactivation of one or more services or applications on the at least one device that can be disrupted by the simultaneous use of one or more functionalities of the at least one device (e.g., a navigation or gaming application and an incoming telephone call). Then in step 407, the transfer platform 103 can cause, at least in part, at least one presentation of the changed context information in a user interface of the at least one device. For example, when the owner of the at least one device (e.g., a mobile phone) starts a navigation application while driving, the transfer platform 103, having already determined that one or more other devices are also onboard, can cause, at least in part, a presentation of the changed context by stating, "Starting navigation, do you want your calls forwarded to one of your passengers during navigation?" Further, in one embodiment, it is contemplated that the transfer platform 103 may also cause, at least in part, the at least one presentation to include various other notifications (e.g., sound, light, vibration, etc.).

FIG. 5 depicts a process 500 of determining and transferring one or more functionalities of the at least one device, content associated with the at least one device, or a combination thereof, according to one embodiment. In one embodiment, the transfer platform 103 performs the process 500 and is implemented in, for instance, a chip set including a processor and a memory as shown in FIG. 9. In step 501, the transfer platform 103 causes, at least in part, at least one presentation of the one or more functionalities of the at least one device that can be transferred, the at least one other user, or a combination thereof in the user interface of the at least one device. As previously discussed, the one or more functionalities include, at least in part, phone calls, text messages, calendar events, contacts, etc. By way of example, the at least one other user may be a family member (e.g., a spouse), one or more friends (e.g., social networking friends), or a combination thereof of the owner of the at least one device. Then in step 503, the transfer platform 103 determines at least one selection of the one or more functionalities, the at least one other user, or a combination thereof, wherein the at least one transfer is further based, at least in part, on the at least one selection. For example, the transfer platform 103 can determine the at least one selection based, at least in part, on at least one user input (e.g., a keypad entry or a voice command).

In step 505, the transfer platform 103 determines one or more automatic protocols for causing, at least in part, the at least one transfer based, at least in part, on the context information, the relationship information, or a combination thereof, wherein the at least one transfer is further based, at least in part, on the one or more automatic protocols. In one example use case, the one or more automatic protocols may be based, at least in part, on the transfer platform 103's determination of the battery status of the at least one device. For example, in one embodiment, if the transfer platform 103 determines that the battery status of the at least one device is above 50%, then the transfer platform 103 will not automatically cause the at least one transfer. However, if the transfer platform 103 determines that the battery status of the at least one device is at 50%, then the transfer platform 103 can cause the at least one transfer of all online services (e.g., video conference calls, emails, calendar updates, etc.) to the at least one other device. Thereafter, if the transfer platform 103 determines that the battery status of the at least one device is between 50% and 25%, then the transfer platform 103 can cause the at least one transfer of all remaining functionalities to the at least one other device except for text messages. Finally, if the transfer platform 103 determines that the battery life of the at least one device is less than 25%, then the transfer platform 103 can cause the at least one transfer of all text messages to the at least one other device and thereby completing the transfer of all of the one or more functionalities of the at least one device to the at least one other device.

In step 507, the transfer platform 103 causes, at least in part, a termination of the at least one transfer based, at least in part, on the changed context information, user input, or a combination thereof. By way of example, in the automobile example use case, when the owner of the at least one vehicle stops driving while using his or her navigation application (e.g., either by stopping the application or by exiting the vehicle), the transfer platform 103 can cause a termination of the at least one transfer of incoming calls, for example, to the at least one other device. By way of further example, in the weekend trip example use case, when the transfer platform 103 determines that the at least one device is being charged (e.g., upon returning from the weekend trip), the transfer platform 103 can cause a termination of the at least one transfer to the at least one other device. As previously discussed, the transfer platform 103 may also cause the automatic deletion of the one or more functionalities, the content associated with the at least one device, or a combination thereof that were transferred to the at least one other device based, at least in part, on the charging of the at least one device.

Figure 6:
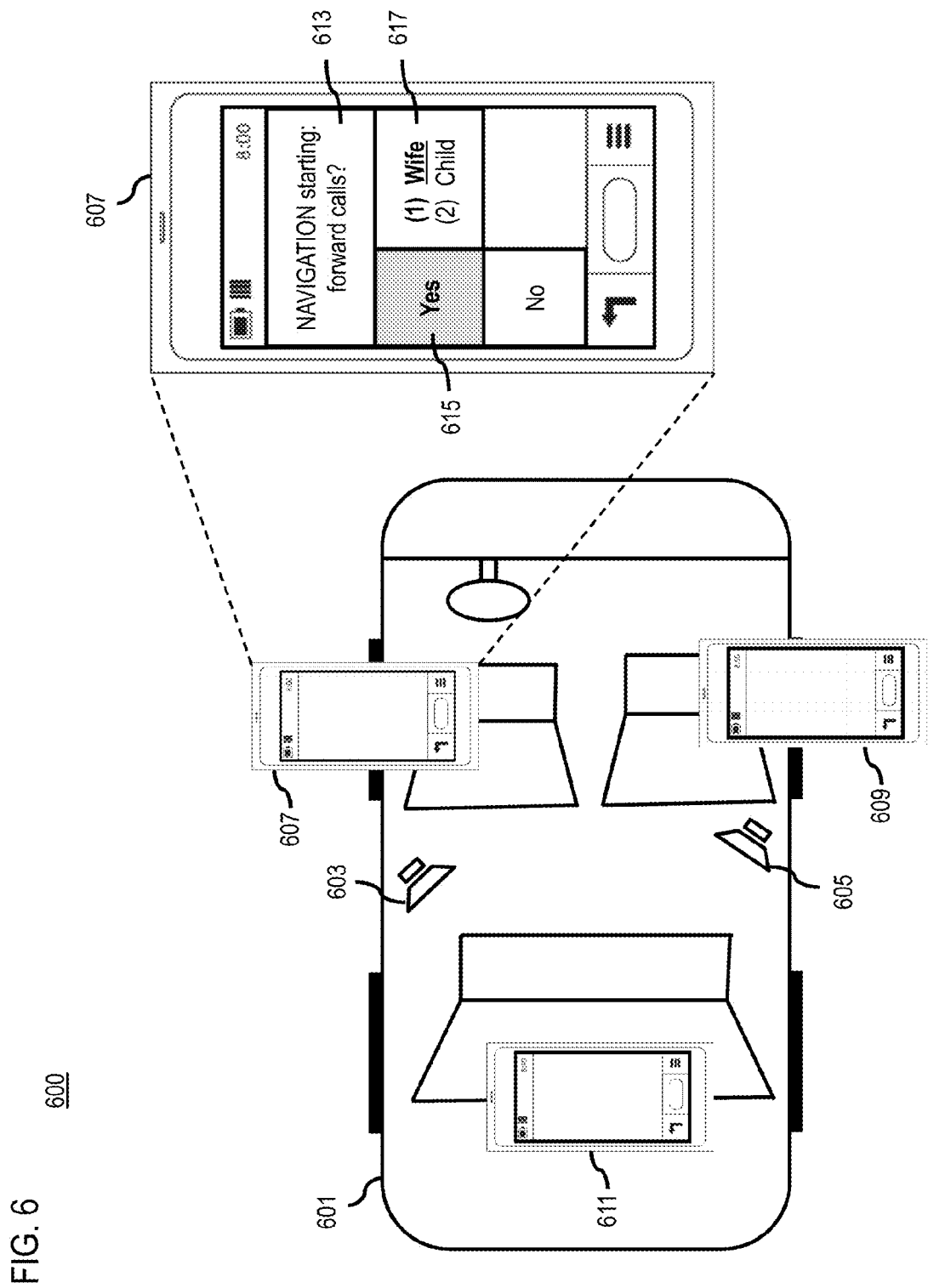
FIG. 6 is a diagram of an example use case depicting the utilization of the processes of FIGS. 3-5, according to various embodiments.

FIG. 6 is a diagram of an example use case depicting the utilization of the processes of FIGS. 3-5, according to various embodiments. As shown, FIG. 6 depicts a family vehicle 601 that has two directional speakers 603 and 605 and one or more access points for at least one short-range wireless communications network (e.g., Bluetooth, BLE, NFC, WiFi, or a combination thereof) (not shown for illustrative convenience). In addition, FIG. 6 also depicts one or more devices (e.g., devices 607, 609, and 611). Further, the owner of the device 607 is driving the vehicle 601 down the road.

In one embodiment, the system 100 first determines context information associated with at least one device (e.g., device 607), at least one other device (e.g., devices 609 and 611), or a combination thereof. As previously discussed, the context information is based, at least in part, on battery status, operation status, capability status, user preference, or a combination thereof. In particular, the system 100 determines that at least one navigation application is running on the device 607 and that the devices 607-611 are identical in terms of battery and capability statuses. In one embodiment, the system 100 determines the location of the at least one device, the at least one other device, or a combination thereof based, at least in part, on the one or more short-range communication technologies, one or more user inputs, or a combination thereof. For example, the system 100 determines that the device 607 is located near the driver's seat of the vehicle 601, the device 609 is located near the front passenger's seat of the vehicle 601, and the device 611 is located near the backseat of the vehicle 601. As previously discussed, in the automobile example use case, the system 100 can determine the location of the devices 607-611 based, at least in part, at least one connection to a Bluetooth, BLE, or WiFi network associated with the vehicle 601, a user input such as a "check in," or a combination thereof.

In one embodiment, the system 100 determines relationship information associated with a user of the at least one device, at least one user of the at least other device, or a combination thereof based, at least in part, on the one or more short-range communication technologies, one or more social networking services, user input, or a combination thereof. Because the vehicle 601 is a family vehicle, the relationship information associated with the devices 607-611 has been previously entered into the system 100 by the owners of the devices 607 and 609. In particular, device 607 is associated with the father of the family, device 609 is associated with the mother of the family, and device 611 is associated with a child. As previously discussed, the system 100 can prioritize which of the devices 609 and 611 the system 100 will first attempt to transfer one or more functionalities of the device 607, content associated with the device 607, or a combination thereof to. In this example use case, because device 609 is owned by the spouse of the owner of device 607, the system 100 assigns the device 609 the highest priority.

In one embodiment, the system 100 can determine at least one change of context information. For example, in this example use case, the system 100 can determine the activation of at least one navigation application of the device 607 and, therefore, cause, at least in part, at least one presentation of the changed context information as depicted by the notification 613 (e.g., "Navigation starting: forward calls?"). In certain embodiments, the system 100 also causes, at least in part, at least one presentation of the one or more functionalities of the device 607 (e.g., telephone calls), at least one other user (e.g., the wife of the owner of the device 607), or a combination thereof. In this example use case, the system 100 determines that the owner of the device 607 has decided to transfer incoming calls to his wife as depicted by the activated interface elements 615 and 617.

In one embodiment, the system 100 then causes, at least in part, at least one transfer of the one or more functionalities of the device 607 (e.g., incoming calls). As previously discussed, the at least one transfer by the system 100 is based, at least in part, on the one or more short-range communications networks within the vehicle 601 (e.g., Bluetooth, BLE, WiFi, or a combination thereof) and the at least one transfer does not require the owner of the device 607 to transfer his SIM card to his wife. In one embodiment, it is contemplated that the at least one other device may include, at least in part, the directional speakers 603 and 605 so that the system 100 can cause, at least in part, at least one transfer of an incoming telephone call from the at least one device to the directional speakers 603 and 605. For example, if the incoming call is from a grandparent that wants to speak to his or her grandchild sitting in the back of the vehicle 601. In one embodiment, the system 100 causes, at least in part, a termination of the at least one transfer of incoming calls, for example, from the device 607 to the device 609 when the owner of the device 607 either stops driving the vehicle 601 and/or stops the navigation application.

Figure 7:
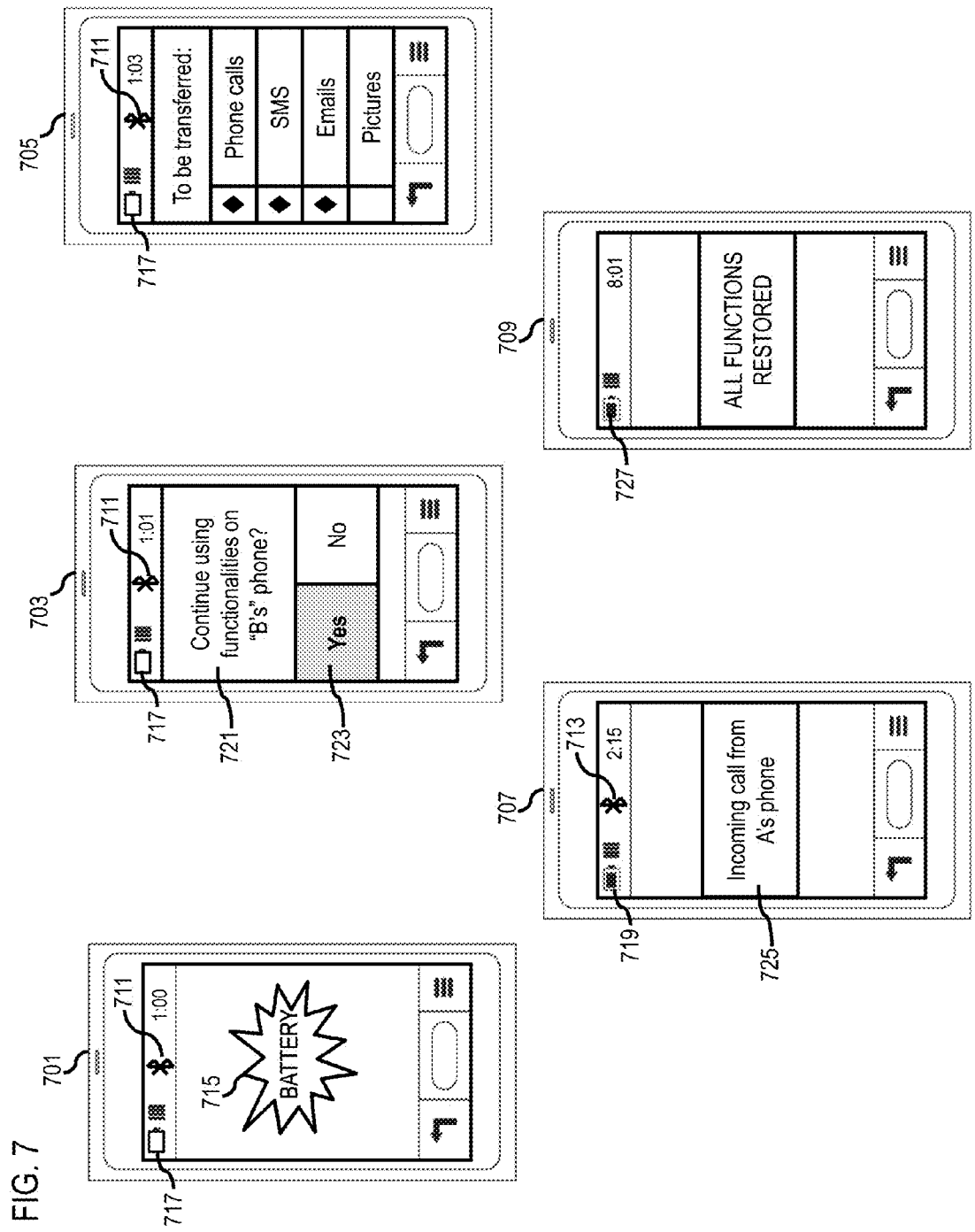
FIG. 7 is a diagram of user interfaces utilized in the processes of FIGS. 3-5, according to various embodiments.

FIG. 7 is a diagram of user interfaces utilized in the processes of FIGS. 3-5, according to various embodiments. As shown, the example user interfaces of FIG. 7 include one or more user interface elements and/or functionalities created and/or modified based, at least in part, on information, data, and/or signals resulting from the processes (e.g., processes 300, 400, and 500) described with respect to FIGS. 3-5. More specifically, FIG. 7 illustrates four user interfaces (e.g., interfaces 701, 703, 705, and 709) owned by user "A" and one user interface 707 owned by user "B".

Similar to the example use case of FIG. 6, in one embodiment, the system 100 first determines context information associated with at least one device (e.g., interfaces 701, 703, and 705) and at least one other device (e.g., interface 707). In this example use case, the system 100 determines that the interfaces 701-705 and interface 707 are nearly identical in terms of battery status and capabilities. In one embodiment, the system 100 next determines the location of the interfaces 701-705 and the interface 707 based, at least in part, on one or more short-range communication technologies, one or more user inputs, or a combination thereof. By way of example, the system 100 determines that the interfaces 701-705 and interface 707 are located near one another based on at least one Bluetooth connection as depicted by the Bluetooth symbols 711 and 713 of interfaces 701-705 and interface 707, respectively. In addition, both user "A" and user "B" have "checked in" at the same popular weekend destination using at least one social networking service. In one embodiment, the system 100 determines relationship information associated with user "A" and user "B" based, at least in part, on the one or more short-range communication technologies, one or more social networking services, user input, or a combination thereof. In this example use case, the system 100 determines that user "A" and user "B" are close friends and that they are on a weekend trip together based, at least in part, on their respective status updates on the at least one social networking service.

Shortly after the start of the trip, the system 100 determines at least one change of context information associated with the interface 701. In particular, the system 100 determines that the battery of interface 701 is about to die and, therefore, causes, at least in part, at least one presentation of the changed context information as depicted by the notification 715 and the battery icon 717. In contrast, the system 100 determines that the battery status of interface 707 is nearly at 100% as depicted by the battery icon 719. In one embodiment, based on the relationship information (e.g., that user "A" and user "B" are friends"), the system 100 acknowledges its state and tries to help out the user "A". More specifically, the system 100 causes, at least in part, at least one presentation of the notification 721 "Continue using functionalities on "B's" phone?" In this example use case, user "A" does want to continue using one or more functionalities on interface 707 as depicted by the activated interface element 723.

In one embodiment, the system 100 next causes, at least in part, at least one presentation of the one or more functionalities of the at least one device that can be transferred to interface 707 as depicted by interface 705. In this example use case, user "A" has selected to transfer phone calls, SMS messages, emails, but has declined to transfer pictures. Approximately, one hour later, the system 100 causes, at least in part, at least one transfer of the one or more functionalities (e.g., an incoming telephone call) from the interfaces 701-705 to the interface 707 based, at least in part, on the context information. As previously discussed, the at least one transfer is based, at least in part, on a Bluetooth connection between the respective interfaces. In one embodiment, the system 100 causes, at least in part, at least one presentation of the incoming transfer as depicted by the notification 725 "Incoming call from A's phone."

In one embodiment, once user "A" and user "B" conclude their weekend trip and user "A" charges the interface 709 as depicted by the battery icon 727, the system 100 causes, at least in part, a termination of the at least one transfer based, at least in part, on the changed context information (e.g., a charged battery), user input, or a combination thereof. In one embodiment, once the battery of interface 709 is charging, the system 100 may also cause, at least in part, the automatic deletion of the one or more functionalities that were transferred from the interfaces 701-705 to the interface 707 during the weekend trip.

The processes described herein for determining context information associated with one or more mobile devices and transferring content and services between the devices based on the context information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
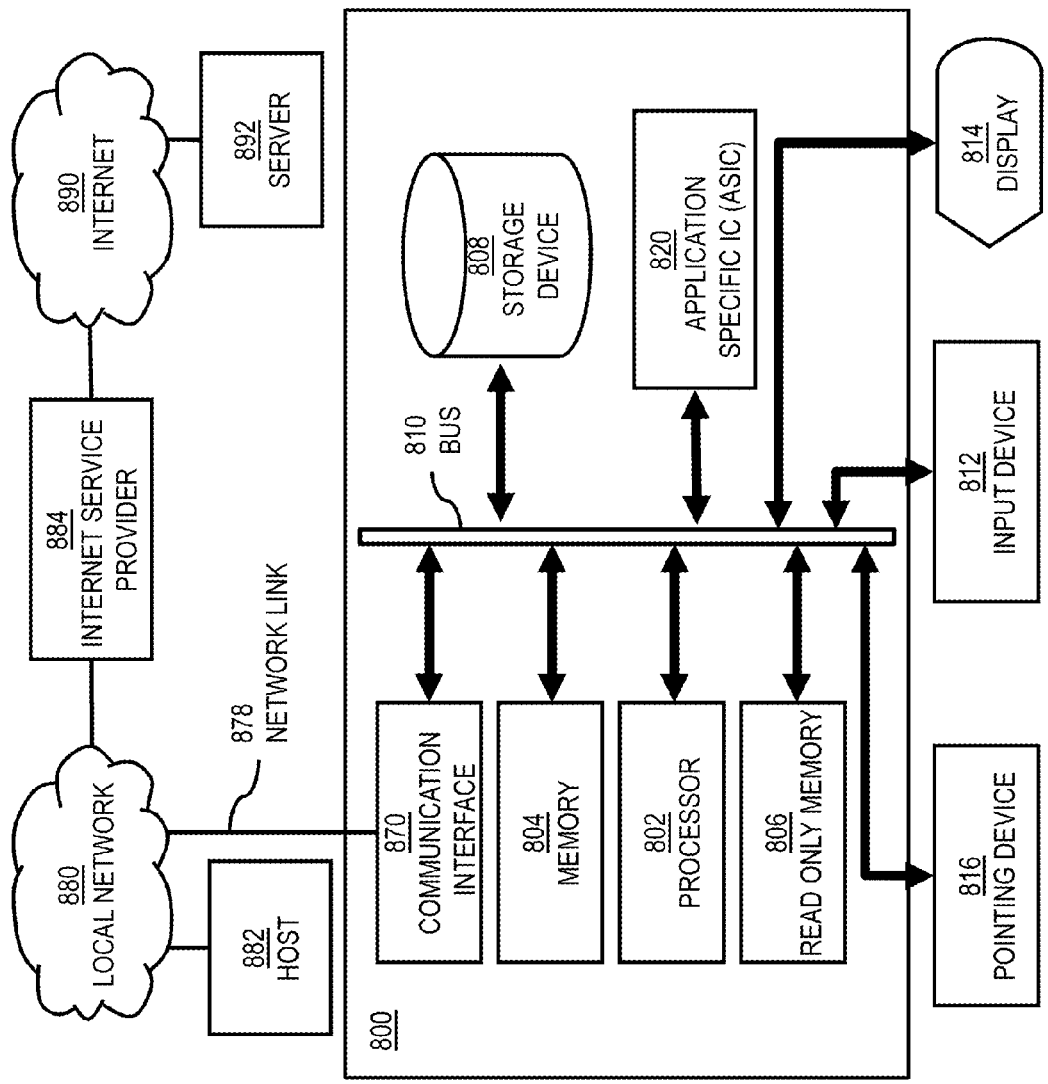
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to determine context information associated with one or more mobile devices and transferring content and services between the devices based on the context information as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of determining context information associated with one or more mobile devices and transferring content and services between the devices based on the context information.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to determine context information associated with one or more mobile devices and transferring content and services between the devices based on the context information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for determining context information associated with one or more mobile devices and transferring content and services between the devices based on the context information. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for determining context information associated with one or more mobile devices and transferring content and services between the devices based on the context information, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for determining context information associated with one or more mobile devices and transferring content and services between the devices based on the context information to the UEs 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to determine context information associated with one or more mobile devices and transferring content and services between the devices based on the context information as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of determining context information associated with one or more mobile devices and transferring content and services between the devices based on the context information.

In one embodiment, the chip set or chip 900 includes a communication mechanism such as a bus 901 for passing information between the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to determine context information associated with one or more mobile devices and transferring content and services between the devices based on the context information. The memory 905 also stores the data associated with or generated by the execution of the inventive steps.

Figure 10:
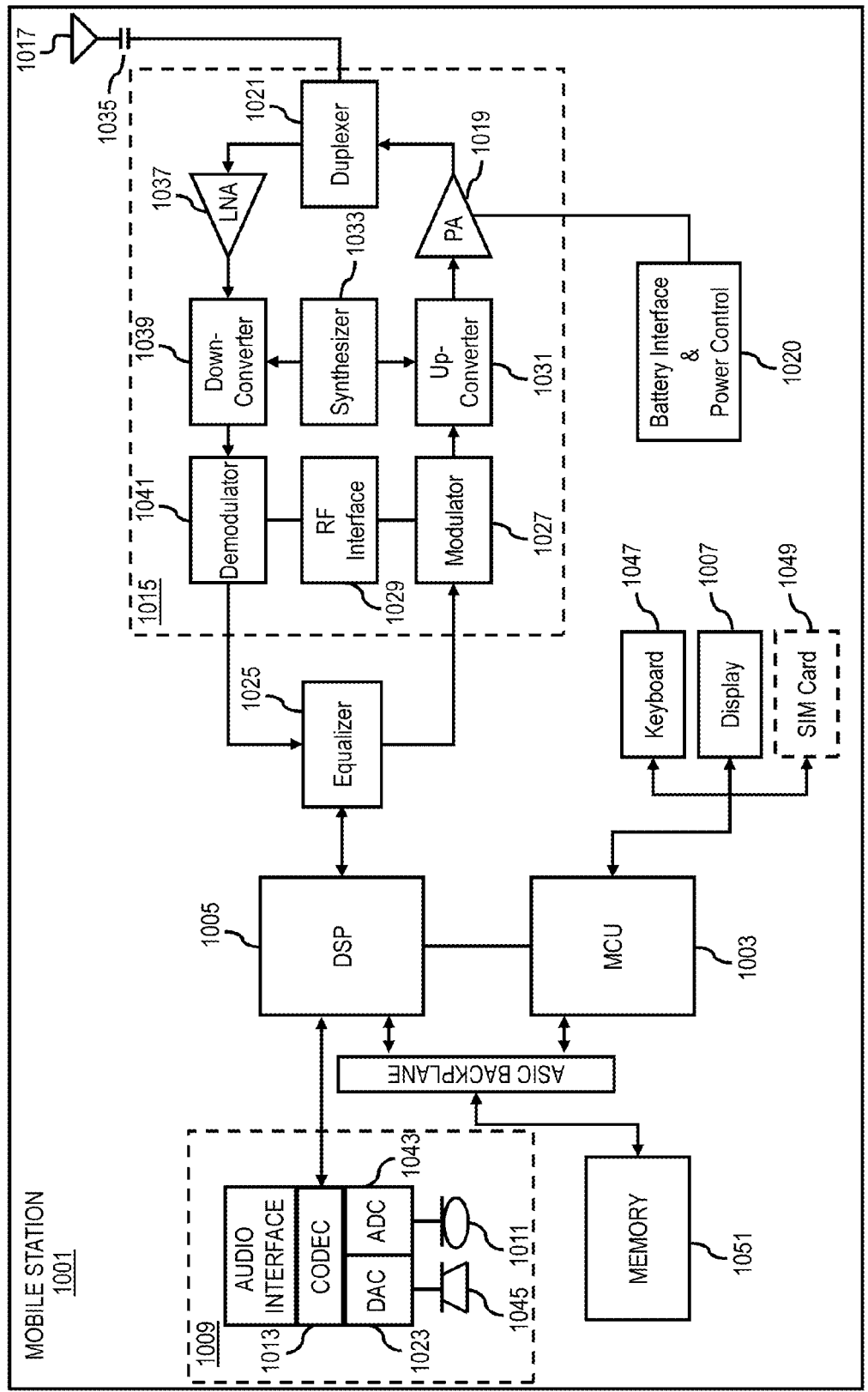
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of determining context information associated with one or more mobile devices and transferring content and services between the devices based on the context information. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of determining context information associated with one or more mobile devices and transferring content and services between the devices based on the context information. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to determine context information associated with one or more mobile devices and transferring content and services between the devices based on the context information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations between the claims, it is contemplated that these features can be arranged in any combination and order.

What is claimed is:

1. A method comprising facilitating a processing of and/or processing, at least one of (1) data, (2) information, and (3) at least one signal based, at least in part, on the following:
    at least one determination of context information associated with at least one device, at least one other device, or a combination thereof; and
    at least one transfer of one or more functionalities of the at least one device, content associated with the one or more functionalities of the at least one device, or a combination thereof from the at least one device to the at least one other device based, at least in part, on the context information,
    wherein the one or more functionalities are equivalent on the at least one device and the at least one other device and the one or more functionalities are associated with one or more hardware capabilities of the at least one device and the at least one other device,
    wherein the at least one transfer of one or more functionalities includes performance of the one or more functionalities by the at least one other device, and
    wherein the at least one transfer of the content includes presentation of the content using the one or more functionalities performed by the at least one other device.

2. A method of claim 1, wherein the at least one of (1) data, (2) information, and (3) at least one signal are further based, at least in part, on the following:
    at least one determination of at least one change of the context information; and
    at least one presentation of the changed context information in a user interface of the at least one device.

3. A method of claim 2, wherein the at least one of (1) data, (2) information, and (3) at least one signal are further based, at least in part, on the following:
    a termination of the at least one transfer based, at least in part, on the changed context information, user input, or a combination thereof.

4. A method of claim 1, wherein the context information is based, at least in part, on battery status, operation status, capability status, user preference, or a combination thereof.

5. A method of claim 1, wherein the at least one of (1) data, (2) information, and (3) at least one signal are further based, at least in part, on the following:
    at least one determination of relationship information associated with a user of the at least one device, at least one user of the at least one other device, or a combination thereof based, at least in part, on one or more short-range communication technologies, one or more social networking services, user input, or a combination thereof,
    wherein the at least one transfer is further based, at least in part, on the relationship information.

6. A method of claim 1, wherein the at least one transfer is based, at least in part, on the one or more short-range communication technologies including, at least in part, near field communication, Bluetooth, wireless fidelity, or a combination thereof.

7. A method of claim 1, wherein the at least one of (1) data, (2) information, and (3) at least one signal are further based, at least in part, on the following:
  at least one determination of one or more automatic protocols for causing, at least in part, the at least one transfer based, at least in part, on the context information, the relationship information, or a combination thereof,
  wherein the at least one transfer is further based, at least in part, on the one or more automatic protocols.

8. A method of claim 1, wherein the at least one of (1) data, (2) information, and (3) at least one signal are further based, at least in part, on the following:
  at least one presentation of the one or more functionalities of the at least one device that can be transferred, the at least one other user, or a combination thereof in the user interface of the at least one device; and
  at least one determination of at least one selection of the one or more functionalities, the at least one other user, or a combination thereof,
  wherein the at least one transfer is further based, at least in part, on the at least one selection.

9. A method of claim 1, wherein the one or more functionalities include, at least in part, one or more phone calls, one or more electronic communications, one or more calendar events, one or more contacts, or a combination thereof.

10. A method of claim 1, wherein the at least one of (1) data, (2) information, and (3) at least one signal are further based, at least in part, on the following:
  at least one determination of at least one location of the at least one device, the at least one other device, or a combination thereof based, at least in part, on the one or more short-range communication technologies, one or more user inputs, or a combination thereof.

11. A method of claim 1, wherein the context information is based, at least in part, on use of another of the one or more functionalities of the at least one device.

12. An apparatus comprising:
  at least one processor; and
  at least one memory including computer program code for one or more programs,
  the at least one memory and the computer program code configured to, with the at least one processor, cause the apparatus to perform at least the following:
    determine context information associated with at least one device, at least one other device, or a combination thereof; and
    cause, at least in part, at least one transfer of one or more functionalities of the at least one device, content associated with the one or more functionalities of the at least one device, or a combination thereof from the at least one device to the at least one other device based, at least in part, on the context information,
  wherein the one or more functionalities are equivalent to the at least one device and the at least one other device and the one or more functionalities are associated with one or more hardware capabilities of the at least one device and the at least one other device,
  wherein the at least one transfer of one or more functionalities includes performance of the one or more functionalities by the at least one other device, and
  wherein the at least one transfer of the content includes presentation of the content using the one or more functionalities performed by the at least one other device.

13. An apparatus of claim 12, wherein the apparatus is further caused to:
  determine at least one change of the context information; and
  cause, at least in part, at least one presentation of the changed context information in a user interface of the at least one device.

14. An apparatus of claim 13, wherein the apparatus is further caused to:
  cause, at least in part, a termination of the at least one transfer based, at least in part, on the changed context information, user input, or a combination thereof.

15. An apparatus of claim 12, wherein the context information is based, at least in part, on location information, battery status, operation status, capability status, user preference, or a combination thereof.

16. An apparatus of claim 12, wherein the apparatus is further caused to:
  determine relationship information associated with a user of the at least one device, at least one user of the at least one other device, or a combination thereof based, at least in part, on one or more short-range communication technologies, one or more social networking services, user input, or a combination thereof,
  wherein the at least one transfer is further based, at least in part, on the relationship information.

17. An apparatus of claim 12, wherein the at least one transfer is based, at least in part, on the one or more short-range communication technologies including, at least in part, near field communication, Bluetooth, wireless fidelity, or a combination thereof.

18. An apparatus of claim 12, wherein the apparatus is further caused to:
  determine one or more automatic protocols for causing, at least in part, the at least one transfer based, at least in part, on the context information, the relationship information, or a combination thereof,
  wherein the at least one transfer is further based, at least in part, on the one or more automatic protocols.

19. An apparatus of claim 12, wherein the apparatus is further caused to:
  cause, at least in part, at least one presentation of the one or more functionalities of the at least one device that can be transferred, the at least one other user, or a combination thereof in the user interface of the at least one device; and
  determine at least one selection of the one or more functionalities, the at least one other user, or a combination thereof.

20. An apparatus of claim 12, wherein the one or more functionalities include, at least in part, one or more phone calls, one or more electronic communications, one or more calendar events, one or more contacts, or a combination thereof.

21. An apparatus of claim 12, wherein the apparatus is further caused to:
  determine at least one location of the at least one device, the at least one other device, or a combination thereof based, at least in part, on the one or more short-range communication technologies, one or more user inputs, or a combination thereof.

* * * * *